(12) United States Patent
Sakurai et al.

(10) Patent No.: US 9,255,509 B2
(45) Date of Patent: Feb. 9, 2016

(54) EXHAUST CLEANER FOR INTERNAL COMBUSTION ENGINE

(75) Inventors: Kenji Sakurai, Kyoto (JP); Toru Kidokoro, Hadano (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 277 days.

(21) Appl. No.: 14/002,268

(22) PCT Filed: Apr. 15, 2011

(86) PCT No.: PCT/JP2011/059407
§ 371 (c)(1),
(2), (4) Date: Aug. 29, 2013

(87) PCT Pub. No.: WO2012/140775
PCT Pub. Date: Oct. 18, 2012

(65) Prior Publication Data
US 2014/0023561 A1 Jan. 23, 2014

(51) Int. Cl.
*F01N 3/10* (2006.01)
*F01N 3/08* (2006.01)
*B01D 53/94* (2006.01)
*F01N 3/20* (2006.01)
*F01N 13/00* (2010.01)

(52) U.S. Cl.
CPC .......... *F01N 3/2066* (2013.01); *B01D 53/9409* (2013.01); *B01D 53/9477* (2013.01); *F01N 3/0814* (2013.01); *F01N 3/0842* (2013.01); *F01N 13/009* (2014.06); *F01N 13/0093* (2014.06); *F01N 13/0097* (2014.06); *B01D 2255/1021* (2013.01); *B01D 2255/1023* (2013.01); *B01D 2255/1025* (2013.01); *B01D 2255/2092* (2013.01); *B01D 2255/91* (2013.01); *F01N 2330/60* (2013.01); *F01N 2510/0682* (2013.01); *Y02T 10/24* (2013.01)

(58) Field of Classification Search
None
See application file for complete search history.

(56) References Cited

U.S. PATENT DOCUMENTS 7,673,445 B2 * 3/2010 Goralski et al. ............ 60/286

FOREIGN PATENT DOCUMENTS

JP 10-205325 A 8/1998
JP 2001-079405 A 3/2001
(Continued)

OTHER PUBLICATIONS

International Search Report for PCT/JP2011/059407, dated Jul. 12, 2011.

*Primary Examiner* — Walter D Griffin
*Assistant Examiner* — Jelitza Perez
(74) *Attorney, Agent, or Firm* — Sughrue Mion, PLLC

(57) ABSTRACT

The exhaust cleaner for internal combustion engine is equipped with NOx storage reduction catalyst (161, 162) which is disposed in exhaust passage of an internal combustion engine and which absorb and reduce the NOx contained in exhaust gas. The NOx storage reduction catalyst (161, 162) each include a coating layer that has been formed on the inner wall of cells through which the exhaust passage, the coating layer having the catalytic function. The coating layers have been formed so that the thickness of the coating layer of the NOx storage reduction catalyst (161) located upstream in the flow of the exhaust gas is smaller than the thickness of the coating layer of the NOx storage reduction catalyst (162) located downstream. Due to this configuration, the NOx storage reduction catalyst (161, 162) are inhibit from being poisoned by sulfur and high NOx removal percentage is maintained.

6 Claims, 2 Drawing Sheets

(56) References Cited

FOREIGN PATENT DOCUMENTS

| | | |
|---|---|---|
| JP | 2003-245523 A | 9/2003 |
| JP | 2005-144294 A | 6/2005 |
| JP | 2010-005591 A | 1/2010 |
| JP | 2010-110730 A | 5/2010 |
| JP | 2010-265802 A | 11/2010 |
| WO | 2010/001226 A1 | 1/2010 |

* cited by examiner

EXHAUST CLEANER FOR INTERNAL COMBUSTION ENGINE

CROSS REFERENCE TO RELATED APPLICATIONS

This application is a National Stage of International Application No. PCT/JP2011/059407 filed Apr. 15, 2011, the contents of all of which are incorporated herein by reference in their entirety.

TECHNICAL FIELD

The invention relates to an exhaust cleaner for an internal combustion engine, and particularly relates to an exhaust cleaner for an internal combustion engine including an NOx storage reduction catalyst and an NOx selective catalytic reduction catalyst.

BACKGROUND ART

For example, Patent Literature 1 discloses a catalyst device for reducing and removing NOx. The catalyst device of Patent Literature 1 reduces and removes NOx with HC in a fuel as a reducer. The catalyst device has two catalysts with different cell sizes in an inside thereof. The two catalysts are disposed in series side by side so that the catalyst with a larger cell size is located at an upstream side.

Further, there has been conventionally known an exhaust cleaning system in which a three-way catalyst (TWC), an NOx storage reduction catalyst (NSR catalyst) and an NOx selective catalytic reduction catalyst (SCR catalyst) are disposed in this order from the upstream side of the exhaust passage of an internal combustion engine. Bank control or rich spike is executed, whereby ammonia ($NH_3$) is generated in the three-way catalyst and the NSR catalyst, and the generated ammonia ($NH_3$) is supplied to the SCR catalyst. In the SCR catalyst, the supplied ammonia ($NH_3$) is used, and the NOx that flows therein is selectively reduced. The system like this aims to enhance the removal performance for NOx by further removing the NOx that remains without being removed by the three-way catalyst and the NSR catalyst, in the SCR catalyst.

CITATION LIST

Patent Literature

Patent Literature 1: Japanese Patent Laid-Open No. 10-205325
Patent Literature 2: Japanese Patent Laid-Open No. 2001-079405
Patent Literature 3: Japanese Patent Laid-Open No. 2010-265802
Patent Literature 4: Japanese Patent Laid-Open No. 2003-245523

SUMMARY OF INVENTION

Technical Problem

Incidentally, an NSR catalyst tends to degrade in catalyst performance thereof by the sulfur components contained in a fuel, that is, to be easily poisoned by sulfur. If the NOx removal performance of the NSR catalyst declines, the situation in which the NOx that is discharged to the downstream side cannot be removed by the SCR catalyst can occur. Accordingly, in the cleaning system using an NSR catalyst and an SCR catalyst, inhibition of sulfur poisoning of the NSR catalyst is desired.

In this respect, the catalyst device of the above described prior art aims to enhance the cleaning performance by securing a flow of the exhaust gas to all of HC-SCR catalysts by making the cell size at the upstream side large. Accordingly, the above described prior art does not contribute to anything in terms of inhibition of sulfur poisoning of the NSR catalyst.

The present invention is made to solve the problem as described above, and has an object to provide an exhaust cleaner that is improved to be able to keep a high NOx removal percentage while inhibiting an NSR catalyst from being poisoned by sulfur.

Solution to Problem

To achieve the foregoing object, an aspect of the present invention provides an exhaust cleaner for an internal combustion engine, including an NOx storage reduction catalyst that is disposed in an exhaust passage of the internal combustion engine, and absorbs or reduces NOx in exhaust gas. The NOx storage reduction catalyst includes a coating layer that is formed on inner walls of cells through which the exhaust gas passes, and has a function as a catalyst. A thickness of the coating layer at an upstream side in a flow of the exhaust gas is smaller than a thickness of the coating layer at a downstream side.

In this invention, the exhaust cleaner may include at least two NOx storage reduction catalysts, and these NOx storage reduction catalysts may be connected in series with respect to a flow of the exhaust gas. In this case, a thickness of a coating layer of the NOx storage reduction catalyst that is disposed at the upstream side is made smaller than a thickness of a coating layer of the NOx storage reduction catalyst at the downstream side.

In this invention, the NOx storage reduction catalyst may have at least two regions that are divided to be at an upstream side and a downstream side and adjacent to each other. In this case, a thickness of the coating layer in each of the regions is made uniform, and out of the regions, the thickness of the coating layer of the region at the upstream side is made smaller than a thickness of the coating layer of the region at the downstream side.

In this invention, the thickness of the coating layer of the NOx storage reduction catalyst may be formed to increase toward the downstream side.

In this invention, the coating layer may contain Rh or Pd, and may contain $Al_2O_3$.

Advantageous Effect of Invention

According to the invention, the coating layer on inner wall of the cells of the NOx storage reduction catalyst is formed so that the thickness of the coating layer at the upstream side is made smaller as compared with the thickness of the coating layer at the downstream side. Here, the NOx storage reduction catalyst tends to capture sulfur components more easily and tends to be more easily poisoned by sulfur, as the thickness of the coating layer is larger, whereas as the thickness of the coating layer is smaller, the cleaning performance of the catalyst tends to be lower. According to the invention, sulfur poisoning is inhibited by disposing the portion with a thin coating layer at the upstream side where sulfur is easily captured, whereas high cleaning performance is secured by disposing the portion with a thick coating layer at the downstream side where sulfur is hardly captured. Namely, according to the exhaust cleaner of the invention, decline of the cleaning performance due to sulfur poisoning is inhibited, and high cleaning performance can be secured.

DESCRIPTION OF EMBODIMENT

Hereinafter, an embodiment of the invention will be described based on the drawings. Note that the common elements in the respective drawings are assigned with the same reference signs, and the redundant description will be omitted. Further, the invention is not limited by the following embodiment.

Embodiment 1

Overall Configuration of System of Embodiment 1

Figure 1:
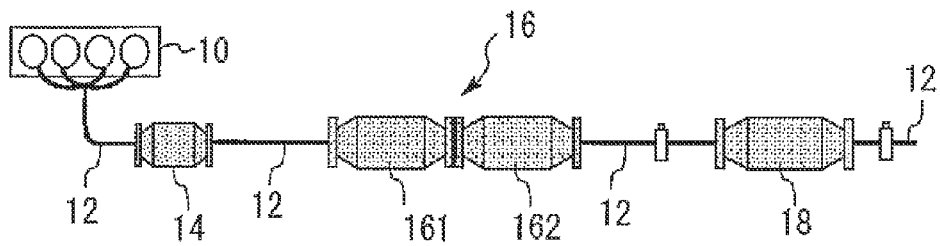
FIG. 1 is a view for explaining an overall configuration of a system of an embodiment of the present invention.

FIG. 1 is a view for explaining an overall configuration of a system of an embodiment of the present invention. As shown in FIG. 1, the system of the present embodiment includes an internal combustion engine 10. An exhaust passage 12 communicates with respective cylinders of the internal combustion engine 10. In the exhaust passage 12, a start catalyst (hereinafter, called "SC") 14 that is a three-way catalyst is disposed.

An NOx storage reduction catalyst (hereinafter, also called an "NSR catalyst") 16 is disposed downstream of the SC 14 in the exhaust passage 12. The NSR catalyst 16 is configured by two NSR catalysts 161 and 162, and both the NSR catalysts 161 and 162 are connected in series. An NOx selective catalytic reduction catalyst (hereinafter, also called an "SCR catalyst") 18 is disposed downstream of the NSR catalyst 16.

Here, in the NSR catalysts 161 and 162, inner walls of a plurality of cells through which exhaust gas passes are covered with a coating layer that functions as a catalyst. The coating layer of each of the NSR catalysts 161 and 162 is configured by a Pt layer containing platinum (Pt), an Rh—Pd layer containing rhodium (Rh) and palladium (Pd), and $Al_2O_3$ layer that is composed of alumina ($Al_2O_3$) on a lower layer being stacked in sequence from a surface. The respective layers configuring both the NSR catalysts 161 and 162 contain Ba, Li and K that are bases, and these bases function as storage materials.

A thickness of the coating layer of the NSR catalyst 161 located upstream is 240 g/L. Meanwhile, a thickness of the coating layer of the NSR catalyst 162 located downstream is 270 g/L. Namely, the coating layer of the NSR catalyst 161 at the upstream side is thinner than the coating layer of the NSR catalyst 162.

[Function of Each Catalyst]

In this system, the internal combustion engine 10 is apt to discharge HC and CO when an air-fuel ratio is rich. Further, when the air-fuel ratio is lean, the internal combustion engine 10 is apt to discharge NOx. The SC 14 reduces NOx (purifies NOx to $N_2$) while absorbing oxygen ($O_2$) in a lean atmosphere, whereas in a rich atmosphere, the SC 14 oxidizes HC and CO (purifies HC and CO to $H_2O$ and $CO_2$) while releasing oxygen. Further, under a rich atmosphere, nitrogen and hydrogen, or HC and NOx that are contained in the exhaust gas react with each other, whereby ammonia ($NH_3$) is generated.

The NSR catalyst 16 absorbs NOx contained in the exhaust gas under a lean atmosphere. Further, the NSR catalyst 16 releases the absorbed NOx under a rich atmosphere. The NOx that is released under the rich atmosphere is reduced by HC and CO. At this time, $NH_3$ is also generated in the NSR catalyst 16 similarly to the case of the SC 14.

The SCR catalyst 18 is configured as a Cu base zeolite catalyst, and have the function of absorbing $NH_3$ generated by the SC 14 and the NSR catalyst 16 under a rich atmosphere, and selectively reducing NOx in the exhaust gas with the $NH_3$ as a reducer under a lean atmosphere. By the SCR catalyst 18, the situation in which $NH_3$ and NOx that are blown downstream of the NSR catalyst 16 are released to the atmosphere can be effectively inhibited.

[Sulfur Poisoning of NSR Catalyst]

Figure 2:
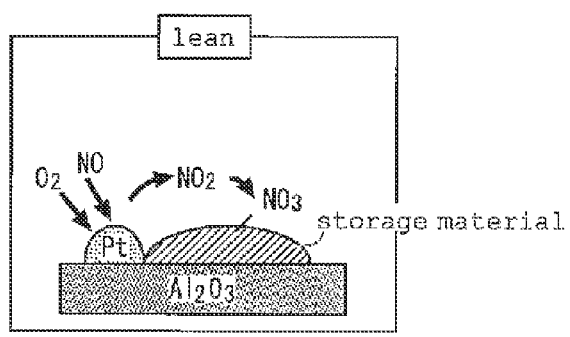
FIG. 2 is a schematic view for explaining a storage mechanism of the NSR catalyst.
Figure 3:
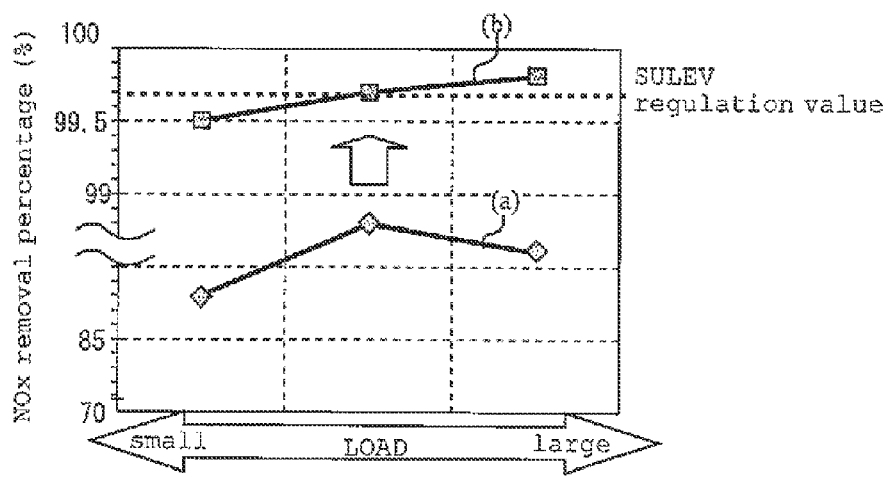
FIG. 3 is a diagram for explaining a removal percentage in the case of a cleaning system functioning normally.

Incidentally, the conventional NSR catalyst is easily poisoned by the sulfur components that are contained in a fuel (hereinafter, "sulfur poisoning"), and as a result, the conventional NSR catalyst tends to bring about degradation in the cleaning performance. FIG. 2 is a schematic view for explaining a storage mechanism of the NSR catalyst under a lean atmosphere in the case of the NSR catalyst functioning normally. FIG. 3 is a diagram for explaining a removal percentage in the case of a cleaning system having the NSR catalyst and the SCR catalyst functioning normally. In FIG. 3, the axis of abscissa represents a load, and the axis of ordinates represents the NOx removal percentage (%). Further, in FIG. 3, the line (a) represents the removal percentage of the exhaust gas that is discharged from the NSR catalyst, and the line (b) represents the NOx removal percentage of the exhaust gas that flows into the SCR catalyst thereafter, and is discharged from the SCR catalyst.

As shown in FIG. 2, in the state in which the NSR catalyst functions normally, oxygen and NO are captured by the platinum catalyst, and $NO_3$ is absorbed into the storage material. When the NSR catalyst functions normally like this, the exhaust gas is cleaned with a relatively high NOx removal percentage (see the line (a) in FIG. 3). The exhaust gas flows into the SCR catalyst, and is cleaned with a high removal percentage in the SCR catalyst (see the line (b) in FIG. 3). From FIG. 3, it is confirmed that in the case of normally functioning, the cleaning system can secure very high removal precision with respect to NOx.

Figure 4:
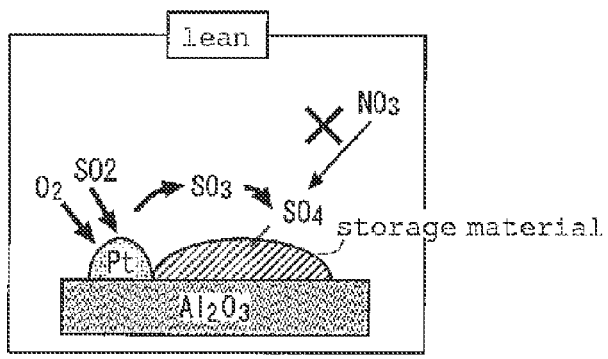
FIG. 4 is a schematic view for explaining a storage mechanism of the NSR catalyst in a case of occurrence of sulfur poisoning of the cleaning system.
Figure 5:
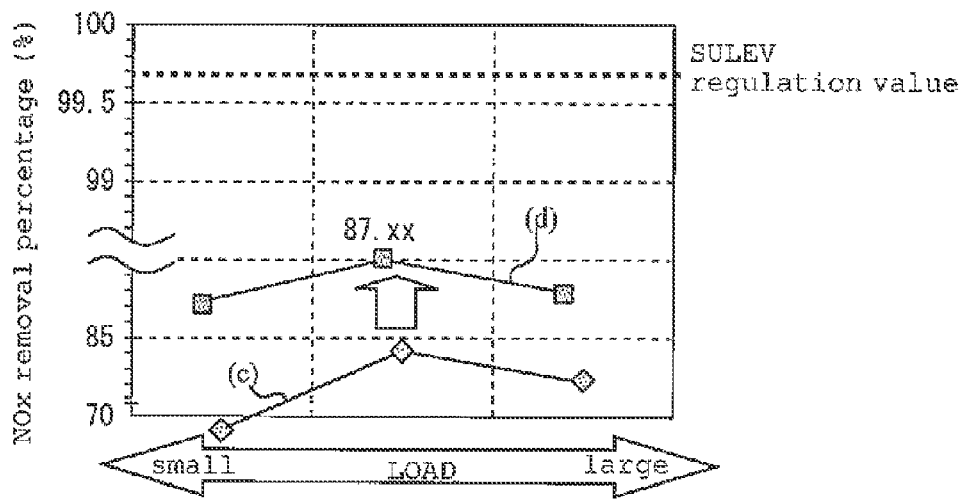
FIG. 5 is a diagram for explaining a removable percentage in a case of the NSR catalyst being poisoned by sulfur.

FIG. 4 is a schematic view for explaining a storage mechanism of the NSR catalyst under a lean atmosphere, in a case of occurrence of sulfur poisoning of the NSR catalyst. FIG. 5 is a diagram for explaining a removable percentage of the cleaning system having the NSR catalyst and the SCR catalyst in a case of the NSR catalyst being poisoned by sulfur. In FIG. 5, the axis of abscissa represents a load, and the axis of ordinates represents an NOx removal percentage (%). Further, in FIG. 5, the line (c) represents the removal percentage of the exhaust gas that is discharged from the NSR catalyst, and the line (d) represents the removal percentage of the exhaust gas that flows into the SCR catalyst thereafter, and is discharged from the SCR catalyst.

In the NSR catalyst, $SO_2$ that is a sulfur component in the exhaust gas more easily reacts than NOx. Therefore, as shown in FIG. 4, $SO_2$ react with a larger amount of $O_2$ and becomes $SO_4$ to be absorbed in the storage material. Thereby, the NSR catalyst is brought into a state poisoned by sulfur. In this state, NOx is hardly absorbed, and the cleaning performance of the NSR catalyst declines (see the line (c) in FIG. 5). As a result, a large amount of NOx is discharged to the SCR catalyst located downstream. When the exhaust amount of NOx is large, the NOx cannot be caught by only the SCR catalyst located downstream, and therefore, NOx remains in the exhaust gas. From FIG. 5, it is found out that when the NOx removal performance of the NSR catalyst declines, high cleaning performance cannot be secured as the entire cleaning system.

[Configuration for Inhibiting NSR Catalyst from Being Poisoned by Sulfur in Present Embodiment]

In the cleaning system of the present embodiment, the NSR catalyst 16 is configured to inhibit sulfur poisoning of the NSR catalyst as described above. As described above, the NSR catalyst 16 is configured by the NSR catalyst 161 located upstream and the NSR catalyst 162 located downstream, and is configured so that the thicknesses of the coating layers on the cell surfaces differ between the NSR catalyst 161 located upstream and the NSR catalyst 162 located downstream.

Here, sulfur components tend to adhere easily when the coating layer of a catalyst is thick, and to be resistant to adhere when the coating layer is thin. Further, the adhering sulfur components tend to be resistant to be desorbed when the coating layer is thick, but tends to be easily desorbed when the coating layer is thin. Namely, it is conceivable that the NSR catalyst is easily poisoned by sulfur when the coating layer is thick, and is more resistant to be poisoned by sulfur when the coating layer is thin.

Meanwhile, it is conceivable that when the coating layer is thin, the removal performance of NOx of the NSR catalyst declines. Namely, in order to keep the cleaning performance of the NSR catalyst high, a certain degree of thickness of the coating layer is needed. Further, sulfur components tend to adhere to the upstream side first, and to hardly reach the downstream side.

From the above, in the present embodiment, the coating layer of the NSR catalyst 161 located upstream is made thin, and the coating layer of the NSR catalyst 162 located downstream is made thick. Namely, in the cleaning system of the present embodiment, at the upstream side where sulfur poisoning easily occurs, the NSR catalyst 161 with the thin coating layer, where sulfur hardly adheres, and the sulfur adhering thereto is easily desorbed, is disposed. In contrast with this, at the downstream side where sulfur poisoning hardly occurs, the NSR catalyst 162 having the thick coating layer with high catalyst cleaning performance is disposed. Thereby, as the entire NSR catalyst 16, degradation of the cleaning performance due to sulfur poisoning can be inhibited, and the cleaning performance of the entire cleaning system can be kept high.

Note that in the present embodiment, the case in which the coating layer is configured by the Pt layer, the Rh—Pd layer, and the $Al_2O_3$ layer that is a precoat layer on the lower layer being stacked in sequence is described. However, in the present invention, the coating layer is not limited to this configuration. For example, the coating layer may be the one that is formed by only the Pt layer and the Rh—Pd layer without containing the $Al_2O_3$ layer, or the one using a layer containing Ti. In the case of using any coating layer, the coating layer of the NSR catalyst at the upstream side is made thin, and the coating layer of the NSR catalyst at the downstream side is made thick, whereby the influence by sulfur poisoning is inhibited, and high cleaning performance can be secured.

Further, in the present embodiment, the case in which the coating layer of the NSR catalyst 161 located upstream is set at 240 g/L, and the coating layer of the NSR catalyst 162 located downstream is set at 270 g/L is described. However, in this invention, the thicknesses of the coating layers are not limited thereto, and are properly set in accordance with required removal percentage or the like.

Further, in the present embodiment, as the NSR catalyst 16, the case in which the two NSR catalysts 161 and 162 are disposed upstream and downstream in series is described. However, in this invention, the NSR catalyst is not limited thereto. For example, the NSR catalyst may be such that three or more NSR catalysts with different thicknesses of the coating layers are disposed. Even if the number of NSR catalysts is increased, high cleaning performance can be secured while sulfur poisoning is inhibited, by installing the NSR catalyst with a thinner coating layer at a more upstream side.

Figure 6:
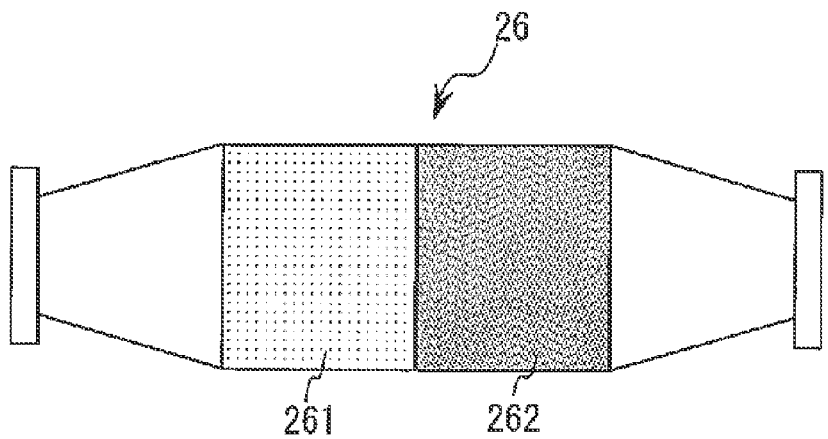
FIG. 6 is a schematic view showing an example of another NSR catalyst that is used as the cleaning system of the embodiment of the present invention.

Further, this invention is not limited to the exhaust cleaner in which a plurality of NSR catalysts are disposed, and may be the exhaust cleaner in which a single NSR catalyst is used and the thickness of the coating layer is varied inside the one NSR catalyst. FIG. 6 is a schematic view showing an example of another NSR catalyst that is used as the cleaning system of the embodiment of the present invention. An NSR catalyst 26 in FIG. 6 is a catalyst that is used as a single piece in place of the two NSR catalysts 161 and 162 in the cleaning system of FIG. 1.

In this example, the NSR catalyst 26 is configured by being divided into two regions 261 and 262 with thicknesses of the coating layer differing from each other in an inside thereof. More specifically, a coating layer on a cell surface of the NSR catalyst 26 is thinner in the region 261 at the upstream side, and is thicker in the region 262 at the downstream side. However, in each of the regions 261 and 262, the coating layer is formed with a substantially uniform thickness. Even when the thickness of the coating layer is varied inside the single NSR catalyst, the effect similar to the case of a plurality of NSR catalysts being disposed can be obtained.

In FIG. 6, the case of being divided into the two regions 261 and 262 is described. However, in this invention, the NSR catalyst may have three or more regions. In this case, the thickness of the coating layer may be made larger stepwise toward the region at the downstream side from the region at a more upstream side.

Further, in the present invention, the NSR catalyst is not limited to the one in which the inside is divided into a plurality of regions, and the thickness of the coating layer is increased stepwise. The NSR catalyst of this invention may be configured so that the thickness of the coating layer gradually becomes larger toward the downstream side from the upstream side in the inside thereof.

Further, in this invention, a plurality of NSR catalysts with different thicknesses of coating layers in each of NSR catalysts as described above may be disposed in series inside. In this case, the coating layers are configured to be thicker stepwise or gradually toward the downstream side of the NSR catalyst located at the downstream side from the upstream side of the NSR catalyst located at the upstream side, and thereby cleaning performance also can be secured while sulfur poisoning is inhibited.

Note that when the numbers such as the numbers, the numerical quantities, the amounts, and the ranges of the respective elements are mentioned, the invention is not limited to the mentioned numbers, unless clearly mentioned otherwise or clearly specified to be the numbers theoretically. Further, the structures or the like described in this embodiment are not always essential to this invention unless clearly specified otherwise or clearly specified to be the structures or the like theoretically.

DESCRIPTION OF NOTATIONS

10 internal combustion engine
12 exhaust passage
14 start catalyst (SC)
16,26,161,162 NOx storage reduction catalyst(NSR catalyst)
18 NOx selective catalytic reduction catalyst(SCR catalyst)

The invention claimed is:

1. An exhaust cleaner for an internal combustion engine, comprising:
    an NOx storage reduction catalyst that is disposed in an exhaust passage of the internal combustion engine, and absorbs or reduces NOx in exhaust gas,
    wherein the NOx storage reduction catalyst
    comprises a coating layer that is formed on inner walls of cells through which the exhaust gas passes, contains a storage material that absorbs NOx, and has a function as a catalyst, and
    wherein a thickness of the coating layer at an upstream side in a flow of the exhaust gas is smaller than a thickness of the coating layer at a downstream side.

2. The exhaust cleaner for an internal combustion engine according to claim 1, further comprising:
    at least two of the NOx storage reduction catalysts,
    wherein the NOx storage reduction catalysts are connected in series with respect to the flow of the exhaust gas, and
    out of the NOx storage reduction catalysts, a coating layer of the NOx storage reduction catalyst that is disposed at the upstream side is thinner than a coating layer of the NOx storage reduction catalyst that is disposed at the downstream side.

3. The exhaust cleaner for an internal combustion engine according to claim 1,
    wherein the NOx storage reduction catalyst has at least two regions that are divided to be at an upstream side and a downstream side and adjacent to each other, and
    a thickness of the coating layer in each of the regions is uniform, and out of the regions, the thickness of the coating layer of the region at the upstream side is smaller than a thickness of the coating layer of the region at the downstream side.

4. The exhaust cleaner for an internal combustion engine according to claim 1,
    wherein the thickness of the coating layer of the NOx storage reduction catalyst is formed to increase toward the downstream side.

5. The exhaust cleaner for an internal combustion engine according to claim 1,
    wherein the coating layer contains Rh or Pd.

6. The exhaust cleaner for an internal combustion engine according to claim 1,
    wherein the coating layer contains $Al_2O_3$.

* * * * *